United States Patent
Horie et al.

(10) Patent No.: US 10,845,784 B2
(45) Date of Patent: Nov. 24, 2020

(54) SENSOR SYSTEM, INFORMATION PROCESSING DEVICE, AND SENSOR MANAGEMENT METHOD

(71) Applicant: OMRON Corporation, Kyoto (JP)

(72) Inventors: Masaru Horie, Kusatsu (JP); Masahiro Takayama, Kusatsu (JP)

(73) Assignee: OMRON Corporation, Kyoto (JP)

( * ) Notice: Subject to any disclaimer, the term of this patent is extended or adjusted under 35 U.S.C. 154(b) by 135 days.

(21) Appl. No.: 16/190,155

(22) Filed: Nov. 14, 2018

(65) Prior Publication Data

US 2019/0265681 A1    Aug. 29, 2019

(30) Foreign Application Priority Data

Feb. 23, 2018  (JP) ................................ 2018-031109

(51) Int. Cl.
    *G05B 19/418*   (2006.01)
    *G06Q 30/06*   (2012.01)
    (Continued)

(52) U.S. Cl.
    CPC ..... *G05B 19/4183* (2013.01); *G01N 21/8806* (2013.01); *G03B 17/14* (2013.01);
    (Continued)

(58) Field of Classification Search
    CPC .......... G05B 19/4183; G05B 19/41875; G05B 2219/31044; H04N 5/23209;
    (Continued)

(56) References Cited

U.S. PATENT DOCUMENTS

| 2003/0193571 A1* | 10/2003 | Schultz | ................. | H04N 5/225 348/207.99 |
| 2012/0150573 A1* | 6/2012 | Soubra | ................. | G06Q 10/06 705/7.11 |

(Continued)

FOREIGN PATENT DOCUMENTS

| CN | 107438398 | 12/2017 |
| EP | 2950285 | 12/2015 |
| JP | 2007214682 | 8/2007 |

OTHER PUBLICATIONS

"Search Report of Europe Counterpart Application", dated May 20, 2019, p. 1-p. 9.

(Continued)

*Primary Examiner* — Nhan T Tran
(74) *Attorney, Agent, or Firm* — JCIPRNET (57) ABSTRACT

The disclosure provides a technique for facilitating management of image sensors having a modular structure. A sensor system includes image sensors and an information processing device. The image sensor is a modular image sensor configured by combining modularized components. Each of the components includes a non-volatile memory for storing specific information related to the component. The information processing device includes an information acquisition part for acquiring the information stored in the memory of the component constituting the image sensor from each of the image sensors in an image sensor group installed in a target range via the network, and an information generation part for generating configuration list information indicating a combination of the components for each of the image sensors with respect to the image sensor group installed in the target range based on the information acquired by the information acquisition part.

8 Claims, 11 Drawing Sheets

(51) Int. Cl.
| | |
|---|---|
| *H04N 5/225* | (2006.01) |
| *H04N 7/18* | (2006.01) |
| *G03B 17/14* | (2006.01) |
| *G01N 21/88* | (2006.01) |
| *H04N 1/00* | (2006.01) |
| *H04N 5/247* | (2006.01) |
| *H04N 5/232* | (2006.01) |
| *G01N 21/84* | (2006.01) |

(52) U.S. Cl.
CPC ... *G05B 19/41875* (2013.01); *G06Q 30/0633* (2013.01); *H04N 1/00538* (2013.01); *H04N 5/2251* (2013.01); *H04N 5/2253* (2013.01); *H04N 5/2254* (2013.01); *H04N 5/2256* (2013.01); *H04N 5/23209* (2013.01); *H04N 5/247* (2013.01); *H04N 7/18* (2013.01); *H04N 7/181* (2013.01); *G01N 2021/8411* (2013.01); *G01N 2021/8845* (2013.01); *G01N 2201/024* (2013.01); *G05B 2219/31044* (2013.01); *H04N 5/23206* (2013.01)

(58) Field of Classification Search
CPC .... H04N 5/2251; H04N 5/247; H04N 5/2253; H04N 1/00538; H04N 7/181; H04N 7/18; H04N 5/2256; H04N 5/2254; H04N 5/23206; H04N 5/2258; G01N 21/8806; G01N 2201/024; G01N 2021/8845; G01N 2021/8411; G03B 17/14; G03B 2206/00; G06Q 30/0633; G01B 11/002
See application file for complete search history.

(56) References Cited

U.S. PATENT DOCUMENTS

2017/0171371 A1\* 6/2017 Jannard ............... H04N 5/2252
2018/0054595 A1\* 2/2018 Odamaki ............... G03B 17/04

OTHER PUBLICATIONS

"Office Action of China Counterpart Application", dated Jun. 17, 2020, with English translation, p. 1-p. 16.

\* cited by examiner

Target range: Line L3
Comparison range: Line L2

Comparison result:
The module configurations
of the image sensors match.

FIG. 11(A)

Target range: Line L3
Comparison range: Line L2
Comparison result:

The illumination module of the
image sensor L33 of the line L3
and the illumination module of
the image sensor L23 of the line
L2 are different.

FIG. 11(B)

SENSOR SYSTEM, INFORMATION PROCESSING DEVICE, AND SENSOR MANAGEMENT METHOD

CROSS REFERENCE TO RELATED APPLICATION

This application claims the priority benefit of Japanese Application No. 2018-031109, filed on Feb. 23, 2018. The entirety of the above-mentioned patent application is hereby incorporated by reference herein and made a part of this specification.

BACKGROUND

Technical Field

The disclosure relates to a technique for managing image sensors used in factory production lines, etc.

Description of Related Art

In the production line of a factory, a system called image sensor is frequently used for automating the inspection and management of products and saving labor. In the past, the configuration that connects a camera and an image processing device with a cable is common (see Patent Document 1), but recently a processing-integrated image sensor has also been launched which integrates the camera and the image processing device so as to perform from imaging to image processing with a single device. Such a processing-integrated image sensor is also called a "smart camera" and may be formed by integrating illuminations and lenses.

RELATED ART

Patent Document

[Patent Document 1] Japanese Laid-open No. 2007-214682

In order to carry out stable inspection with the image sensor, it is desirable to optimize the model (type), specification and performance of the illuminations, lenses, and imaging elements according to the imaging environment, the object to be inspected, the purposes, etc. Therefore, makers who provide smart cameras have lined up a large number of products such as illuminations, lenses, imaging elements, etc., with the model (type), specification and performance changed little by little, for the user to select the one with the optimum specification.

However, as the IoT (Internet of Things) development of factories is accelerating, the range of application of smart cameras has expanded, and it is becoming difficult to provide product variations that cover the diverse user needs. Further, in order to be distinguished from the competitors in product competition, more mass customization and seasonal products are offered to meet the preference of each customer and the life cycle of the products of digital devices typified by smart phones is shortening, and there is an increasing need for partially changing the illuminations and lenses, etc. so that change of the object to be inspected enters a short cycle to be optimum for the inspection. Thus, in the recent years, the so-called modular structure smart camera has been introduced, which respectively modularizes the illuminations, lenses, and imaging elements for the user to freely combine the illuminations, lenses, and imaging elements. For example, if the maker provides five types of illumination modules, lens modules, and imaging element modules, there are 125 possible combinations, from which the user can select a combination that matches the required specification.

The modular structure has the merits of reducing product variations for the makers and increasing choices and flexibility for the user. On the other hand, the following demerits raise concerns. In the past, managing the equipment in units of the image sensor is sufficient to deal with the trouble and maintenance in the factory. However, when the image sensor having a modular structure is introduced, each image sensor may be composed of any combination of modules and it is foreseeable that there will be a higher demand for grasping details of the respective modules (date of production, time of introduction, time of use, history of diversion from other equipment, detailed specification, etc.), and management, maintenance and preservation of the equipment may be complicated. Usually a large number of image sensors are installed in the factory (for example, when it comes to a large-scale factory, the number may be up to several hundreds to several thousands). Therefore, it increases the trouble in management, maintenance and preservation, which is a serious problem. For example, at the time when a copy line having the same configuration as the production line in operation is newly installed, in the past, it was sufficient to examine the format of each image sensor installed on the production line in operation, but in the case that image sensors having a modular structure are used, it is necessary to individually check the formats of a plurality of modules attached to each image sensor, which results in wasting much more labor.

The disclosure has been made in view of the above and provides a technique for facilitating management of image sensors having a modular structure.

SUMMARY

A first aspect of the disclosure provides a sensor system including a plurality of image sensors and an information processing device connected to the plurality of image sensors via a network. The image sensor is a modular image sensor configured by combining a plurality of components. Each of the plurality of components includes a non-volatile memory for storing specific information related to the component. The information processing device includes an information acquisition part for acquiring information stored in the non-volatile memory of the component constituting the image sensor from each of the image sensors in an image sensor group installed in a target range via the network, and an information generation part for generating configuration list information indicating a combination of the components for each of the image sensors with respect to the image sensor group installed in the target range based on the information acquired by the information acquisition part.

DESCRIPTION OF THE EMBODIMENTS

<Application Example>

Figure 1:
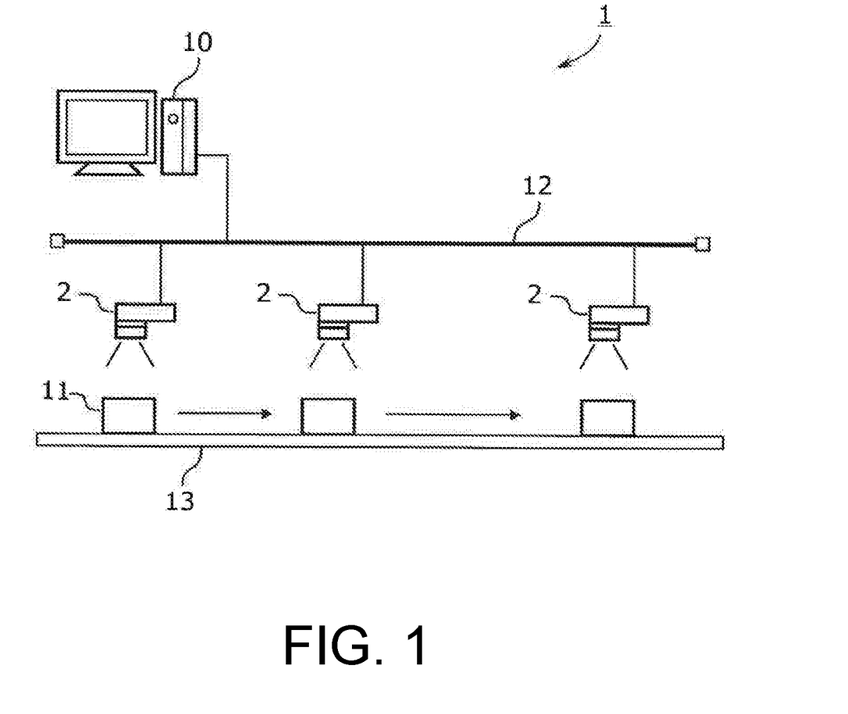
FIG. 1 is a diagram schematically showing an example of the overall configuration of a sensor system.
Figure 2A:
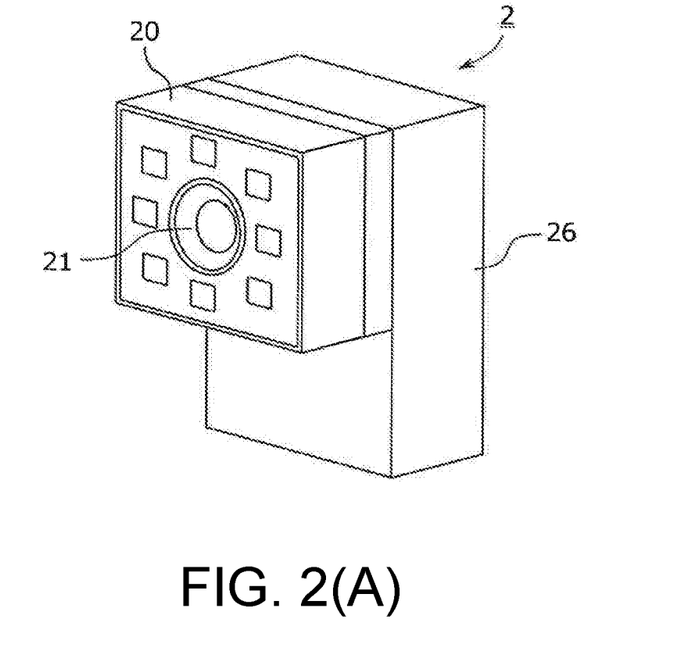
FIG. 2(A) is a perspective view schematically showing the appearance of the image sensor and FIG. 2(B) is a perspective view schematically showing a state where the image sensor is disassembled.
Figure 2B:
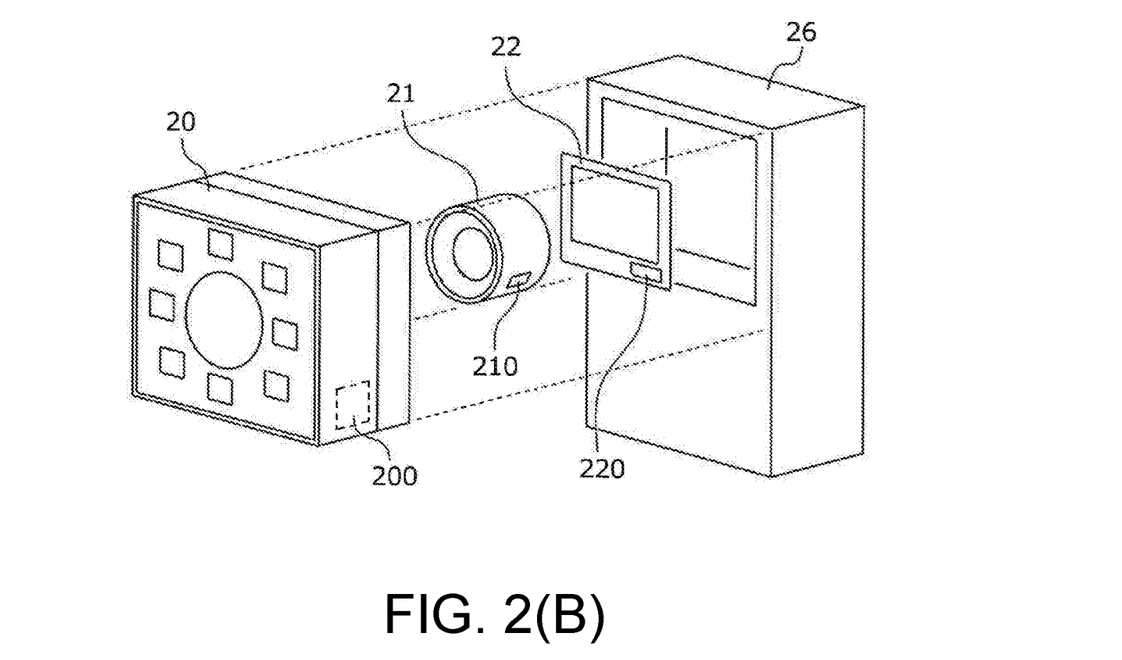

First, an example of the scene to which the disclosure is applied will be described. FIG. 1 shows an example of the overall configuration of a sensor system according to an embodiment of the disclosure. FIG. 2(A) and FIG. 2(B) schematically show an example of an image sensor according to an embodiment of the disclosure.

A sensor system 1 of the present embodiment is a system for inspecting and managing a product 11 on a production line, etc. and includes a plurality of image sensors 2 and an information processing device 10. The information processing device 10 is connected to the image sensors 2 via an industrial network 12 such as EtherCAT and may transmit and receive data via the network 12 to/from each of the image sensors 2. In the example of FIG. 1, three image sensors 2 are installed for imaging the product 11 flowing on a conveyor 13. However, the number of the image sensors 2 is not limited to three, and in a large factory, there may be several tens to hundreds or more image sensors in some cases.

The image sensor 2 of the present embodiment is a processing-integrated image sensor having a so-called modular structure. An illumination part 20, a lens part 21, and an imaging part 22, which are components of the imaging system, are modularized respectively and the user can combine the respective modules as desired according to the purposes, etc. of the image sensor 2. Each module (i.e., the illumination part 20, the lens part 21, and the imaging part 22) is provided with a non-volatile memory 200, 210, or 220 for storing specific information related to the module. The specific information related to the module may, for example, include one or more of the following: information for specifying the format of the module, information for specifying the individual of the module, information indicating the specification of the module, information indicating the performance of the module, information indicating the function of the module, information for determining the replacement time and the maintenance time of the module, etc.

The information processing device 10 may acquire the information stored in the memories 200, 210, and 220 of the modules respectively from the plurality of image sensors 2 installed in a target range via the network 12. Then, based on the acquired information, the information processing device 10 may generate configuration list information indicating a combination of the modules for each of the image sensors 2 with respect to the image sensor group installed in the target range. Also, based on the acquired information, the information processing device 10 may perform totalization for each format of module with respect to the image sensor group installed in the target range and generate totalization information indicating the quantity of each format of module.

In this way, the non-volatile memory is provided for each module, and the specific information related to the module can be stored therein and referred to therefrom, so the information processing device 10 can accurately and easily collect the module configurations and details of the plurality of image sensors 2 installed in the production line. The configuration list information as described above is useful for grasping, managing, and inspecting the configuration of each of the image sensors 2 installed in the target range, for example. Moreover, the totalization information is useful for grasping and managing the quantity of each format of module used in the image sensor group installed in the target range. Further, the totalization information may also be used for the purpose of grasping the equipment cost, for example. Besides, at the time when a new production line having the same configuration as the existing production line is newly installed, the totalization information may also be used to generate order information for purchasing required equipment (image sensors, their modules, etc.).

<Configuration of the Image Sensor>

Figure 3:
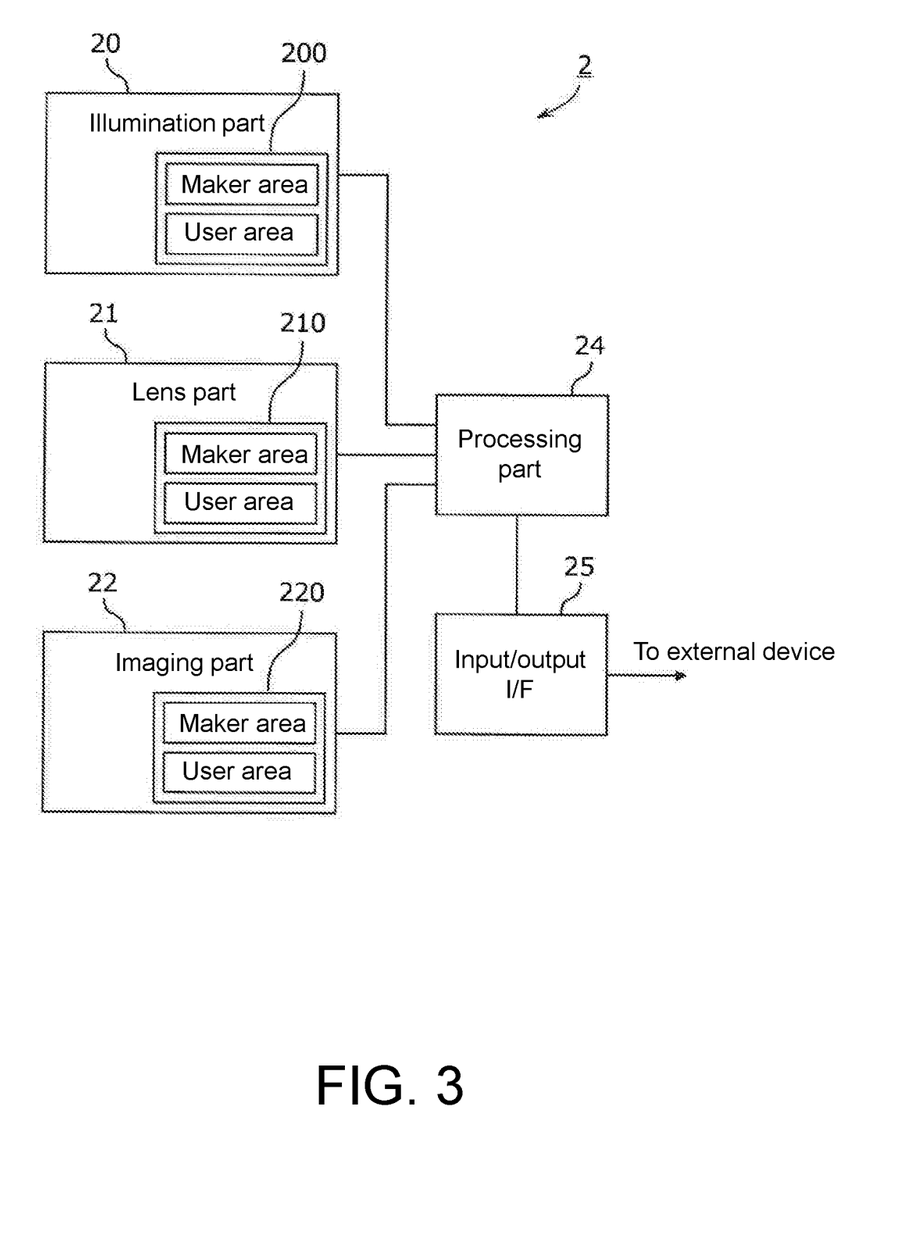
FIG. 3 is a block diagram schematically showing the configuration of the image sensor.

The image sensor according to an embodiment of the disclosure will be described with reference to FIG. 2(A), FIG. 2(B), and FIG. 3. FIG. 2(A) is a perspective view schematically showing the appearance of the image sensor and FIG. 2(B) is a perspective view schematically showing a state where the image sensor is disassembled. FIG. 3 is a block diagram schematically showing the configuration of the image sensor.

The image sensor 2 is a device installed in a production line of a factory, for example, and used for various processes using images. The image sensor 2 is also called a vision sensor or a vision system. The image sensor 2 of the present embodiment is a processing-integrated image sensor (the so-called smart camera) formed by integrating an imaging system and a processing system.

The image sensor 2 includes the illumination part 20, the lens part 21, and the imaging part 22 as the imaging system. The illumination part 20 is a device for illuminating a subject (an object to be inspected, etc.) within a field of view of the image sensor 2 and is composed of a plurality of light emitting elements (LEDs, etc.) arranged around the lens part 21, for example. The lens part 21 is an optical system for forming an optical image of the subject on the imaging part 22. For example, an optical system having functions such as focus adjustment, aperture, zoom, etc. is used. The imaging part 22 is a device for generating and outputting image data through photoelectric conversion and is composed of imaging elements such as CCD and CMOS, for example.

The image sensor 2 further includes a processing part 24 and an input/output interface (input/output I/F) 25 as the processing system. The processing part 24 is a device for performing image processing (for example, preprocessing, feature amount extraction, etc.) on the image data taken from the imaging system, various processes based on the result of the image processing (for example, inspection, character recognition, individual identification, etc.), data transmission/reception with an external device via the input/output interface 25, generation of data to be outputted to the external device, processing of data received from the external device, control of the imaging system and the input/output interface 25, etc. The processing part 24 is composed of a processor and a memory, for example, and the processor reads and executes programs stored in the memory so as to realize the various processes described above. A part or all of the functions of the processing part 24 may be realized by an ASIC (Application Specific integrated Circuit), an FPGA (Field Programmable Gate Array), etc. or may be provided by the external device. The input/output interface 25 is a communication interface for transmitting/receiving data to/from the external device. For example, the input/output interface 25 includes a network interface for connecting to a PLC (Programmable Logic Controller) or the information processing device 10, a parallel interface for connecting to another sensor or controller, etc.

The image sensor 2 of the present embodiment has a modular structure in which, as shown in FIG. 2(B), the three modules, i.e., the illumination part 20, the lens part 21, and the imaging part 22, are selected and attached to a sensor body 26. Regarding the illumination part, it is also possible to use it without selecting it. Each of the modules is fixed to the sensor body 26 by screw fastening, for example, and the user can attach/detach the module freely.

Multiple types of modules are prepared to serve as the illumination part (illumination module) 20, such as modules with illumination lights of different wavelengths like white illumination/red illumination/infrared light illumination, and modules with different light emitting element arrangements, light quantities, or light emitting patterns. Further, multiple types of light sources (LEDs, etc.) such as red, blue, green, and infrared light sources are provided in one module, and an illumination module that is capable of irradiating lights of wavelengths (for example, white, violet, pink, etc.) other than red, blue, green, and infrared through control of light emission of each light source may also be used. This type of illumination is called multi-color illumination, etc. Multiple types of modules are prepared to serve as the lens part (lens module) 21, such as a module having a function of adjusting the focus manually or automatically with use of an actuator, etc., a module with different fields of view such as a narrow field of view/a wide field of view, and a module having a zoom function. Multiple types of modules are prepared to serve as the imaging part (imaging module) 22, such as modules having different numbers of pixels, frame rates, and shutter types (rolling shutter/global shutter). The user can combine proper modules as appropriate according to the purpose or the required specification of the image sensor 2.

A non-volatile memory is incorporated in each module. Specifically, as shown in FIG. 3, an illumination module memory 200 is incorporated in the illumination part 20, a lens module memory 210 is incorporated in the lens part 21, and an imaging module memory 220 is incorporated in the imaging part 22. Hereinafter, these are collectively referred to as "module memory". For example, EPROM (Electrically Programmable Read Only Memory), EEPROM (Electrically Erasable Programmable Read Only Memory), FeRAM (Ferroelectric Random Access Memory), MRAM (Magnetoresistive Random-Access Memory), etc. can be used as the module memory, and the module memory may have any data capacity. In the present embodiment, an EEPROM having a capacity of several kilobytes to several tens of megabytes is used.

In the module memory, two writing areas, i.e., "maker area" and "user area", are provided. The maker area is an area for the maker to write module default data. The user can read the data in the maker area but cannot rewrite or delete the data in the maker area. For example, format information (format name, format number, etc.) and individual information (serial number, lot number, hardware version, etc.) of the module are stored in the maker area. In addition, setting values and correction parameters during driving of the module, and individual variation information of the module (for example, data measured by factory shipment inspection) may be stored in the module memory. For example, in the case of the illumination part, the illumination control setting values (control type, voltage, duty, delay, block lighting method, etc.), variation in brightness and color tone of each light source, optical axis information, etc. may be stored. In the case of the lens part, lens/focus setting values (focus initial reference value, etc.), presence/absence of AF (auto focus) function, focal length, angle of view, F number (focal ratio), distortion amount, optical axis information, etc. may be stored. Further, in the case of the imaging part, camera setting values (setting initial value of the imaging element, etc.), pixel defect correction, vertical stripe correction data, white balance initial value, etc. may be stored. In contrast, the user area is an area that the user can rewrite. The user can freely use the user area. For example, any information may be stored therein, such as the information that specifies the location (factory, production line) where the image sensor is installed, information on the purchase date and maintenance date of the module, status of use of the module, etc. Nevertheless, the above is merely an example, and any data that is useful information for management and operation of the image sensor 2 may be stored in the module memory.

The image sensor 2 can be used for various purposes. For example, the image sensor 2 can be used for recording the image of the object under inspection, recognizing the shape, detecting the edge, measuring the width and the number, measuring the area, acquiring color features, labeling and segmentation, object recognition, reading bar codes and two-dimensional codes, OCR (Optical Character Recognition), individual identification, etc. FIG. 1 shows an example of imaging the product 11 flowing on the conveyor 13 with the image sensor 2 and inspecting the appearance of the product 11.

<Configuration of the Information Processing Device>

Figure 4:
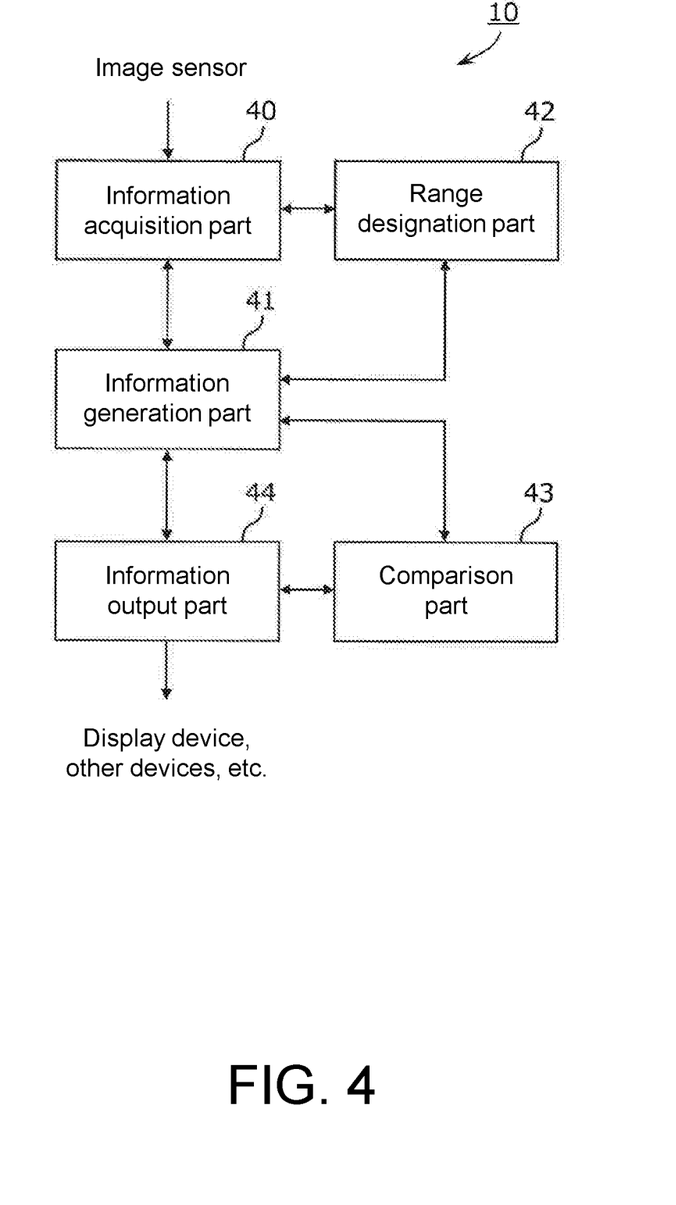
FIG. 4 is a block diagram schematically showing the configuration of the information processing device.

FIG. 4 schematically shows the configuration of the information processing device 10.

The information processing device 10 is a management device for managing the image sensors 2 and includes an information acquisition part 40, an information generation part 41, a range designation part 42, a comparison part 43, and an information output part 44 as the main configuration. The information acquisition part 40 performs a process of acquiring the information stored in the module memory of each module constituting the image sensor 2 from the image sensors 2 existing on the network via the network. The information acquisition part 40 may acquire the information in the module memory all at once or may selectively acquire only the necessary information. The information generation part 41 performs a process of generating information on the module configuration of the image sensor group installed in the target range by using the information acquired by the information acquisition part 40. The range designation part 42 performs a process of receiving designation of the target range performed by the user. The target range is a range for information generation. For example, it is preferable that the target range can be designated in units such as a factory, a production line in the factory, or a process in the production line. The comparison part 43 performs a process of comparing the configuration list information of a first image sensor group installed in the target range and the configuration list information of a second image sensor group installed in a range (referred to as a comparison range) that is different from the target range, and extracting a difference between the first image sensor group and the second image sensor group. The information output part 44 performs a process of outputting the information generated by the information generation part 41. The information output part 44 may display information on a display device, transmit information to other devices (PLC, controller, sensor, actuator, production equipment, etc.) on the production line via the network, notify a message, etc. to a user terminal (for example, a terminal of a manager or a maintainer of a production line) via the network, transmit information to another computer or a cloud via the network, or output information to a printer. Specific examples of the process of the information processing device 10 will be described later.

The above-described information processing device 10 is realized, for example, by installing necessary programs to a computer having a CPU (Central Processing Unit) (processor), a main storage device (memory), an auxiliary storage device (mass storage with a hard disk, a solid state hard disk drive, etc.), a communication interface (communication I/F), an input device (a keyboard, a pointing device, etc.), a display device, etc. In this case, the information acquisition part 40, the information generation part 41, the range designation part 42, the comparison part 43, and the information output part 44 described above are realized by developing and executing, by the CPU, the programs stored in the auxiliary storage device in the main storage device. Some or all of the functions provided by the information processing device 10 may also be realized by circuits such as ASIC, FPGA, etc. Alternatively, some of the functions may be distributed and processed by other computers or executed by a cloud server.

<Example of the Management Process Using the Module Memory>

In the image sensor 2 of the present embodiment, since each of the modules (components) has a non-volatile memory, the specific information, etc. related to each module can be stored in the memory of the module itself, which makes it possible to handle the module (hardware) and the specific information thereof (software) in a linked manner. By referring to the information in the memory of each module, the processing part 24 of the image sensor 2 and the information processing device 10 can easily acquire accurate information on the modules attached to the image sensor 2 through software. Therefore, it is possible to facilitate management (including operation, maintenance, and preservation) of many image sensors 2 existing in the production line. Hereinafter, some management processes using the module memory will be exemplified.

(1) Collection of the Module Configuration

Figure 5:
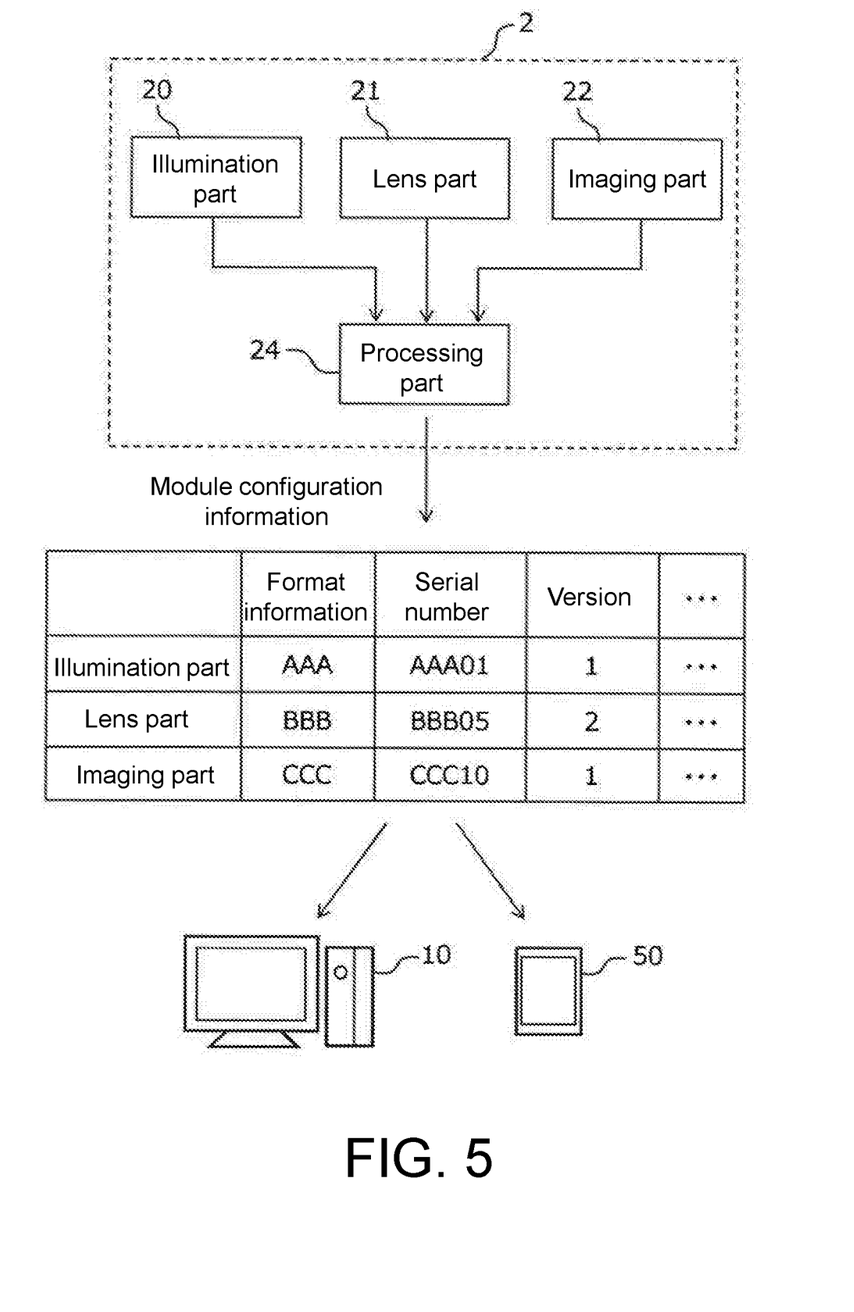
FIG. 5 is a diagram showing an example of collection of the module configuration information.

As shown in FIG. 5, upon start-up of the image sensor 2 or in response to a request from the information processing device 10 or a user terminal 50, the processing part 24 reads information respectively from the memory 200 of the illumination part 20, the memory 210 of the lens part 21, and the memory 220 of the imaging part 22, and based on the information, generates module configuration information representing the combination of the modules attached to the sensor body 26 and records it in the memory in the processing part 24. The processing part 24 sends the module configuration information to the information processing device 10 or the user terminal 50 spontaneously (periodically) or in response to a request from the information processing device 10 or the user terminal 50. Alternatively, if the image sensor 2 has a display, the processing part 24 may display the module configuration information on the display.

The user terminal 50 is a portable computer used by a user (equipment manager, maintainer, etc.) and can communicate with the image sensor 2 via the network (or directly via short range wireless communication, etc.). For example, a mobile PC, a smartphone, a tablet terminal, a wearable terminal, etc. may be used as the user terminal 50.

By using the function of collecting the module configuration described above, the user can easily collect and grasp the module configuration of the image sensor 2 in operation. In addition, it is easy for the information processing device 10 to automatically collect the module configuration information of many image sensors 2 installed in the production line or factory and manage them unitarily. Such a function is more useful as the number of the image sensors 2 installed increases and as the variation in the module configurations of the image sensors installed in the production line or the factory increases.

(2) Generation of the Configuration List Information

Figure 6:
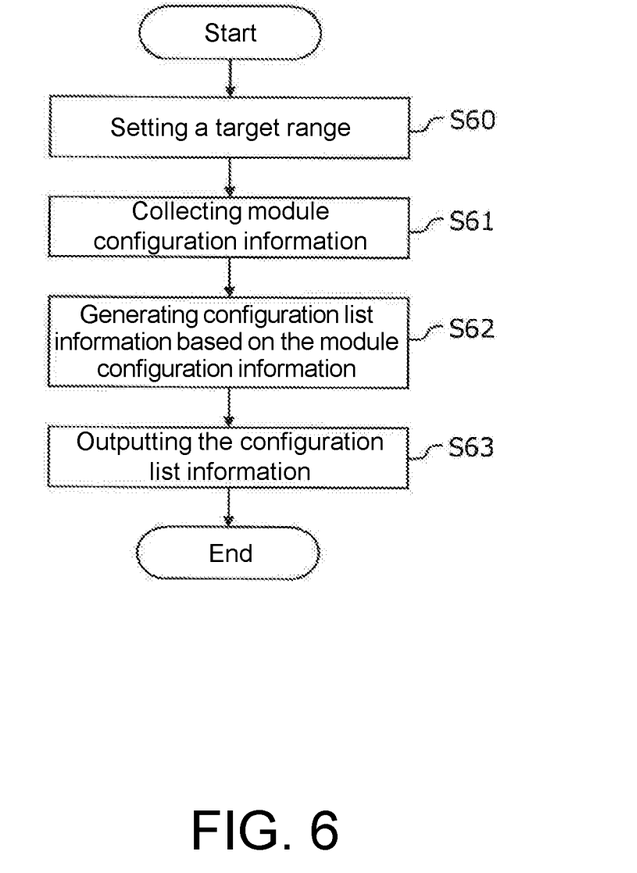
FIG. 6 is a diagram showing an example of a generation process of the configuration list information.
Figure 7:
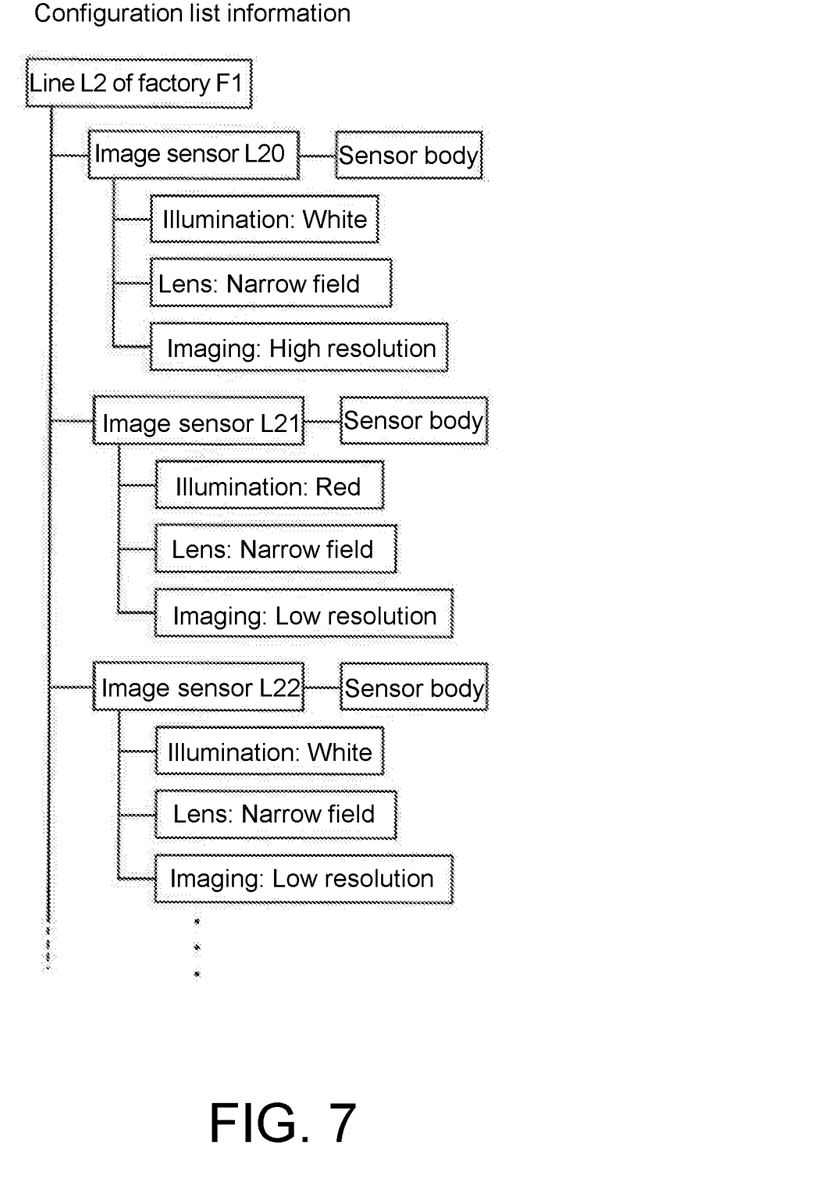
FIG. 7 is a diagram showing an example of an output of the configuration list information.

FIG. 6 shows an example of a generation process of the configuration list information performed by the information processing device 10, and FIG. 7 shows an example of the configuration list information outputted by the information processing device 10.

In step S60, the range designation part 42 sets a target range for generating the configuration list information. For example, the range designation part 42 displays candidates (options) of the target range such as "factory F1/factory F2/factory F3/ . . . " or "line L1/line L2/line L3/ . . . " on the screen of the information processing device 10 and lets the user select the desired target range. In the present embodiment, the following description will be made assuming that "the line L2 of the factory F1" has been selected as the target range.

In step S61, the information acquisition part 40 acquires module configuration information from all of the image sensors 2 installed in the line L2 of the factory F1, which is the target range. The method of acquiring the module configuration information is as described above. In the case that the information processing device 10 already stores the module configuration information acquired in the past in the database, the module configuration information may be read from the database instead of being acquired from the process of step S61.

In step S62, the information generation part 41 generates configuration list information indicating the module configurations of all of the image sensors 2 installed in the line L2 of the factory F1 by using the module configuration information collected in step S61. In step S63, the information output part 44 outputs the configuration list information to the display device. FIG. 7 shows an example of display of the configuration list information. In this example, a list of combinations of modules of image sensors L20, L21, L22 . . . is displayed sequentially starting from the image sensor L20 installed on the upstream side of the line L2. Such configuration list information is useful for grasping, managing, and inspecting the configuration of each of the image sensors installed in the target range. For example, the configuration list information may be used as a check list at the time of performing inspection on the modules of the individual image sensors L20, L21, L22 . . . installed in the line L2. Also, when trouble occurs in the line L2, the configuration list information may be referred to for investigating the cause and planning a countermeasure. Furthermore, at the time when a copy line of the line L2 is newly installed, the configuration list information of the line L2 may be used as the design specification of the copy line.

(3) Generation of the Totalization Information

Figure 8:
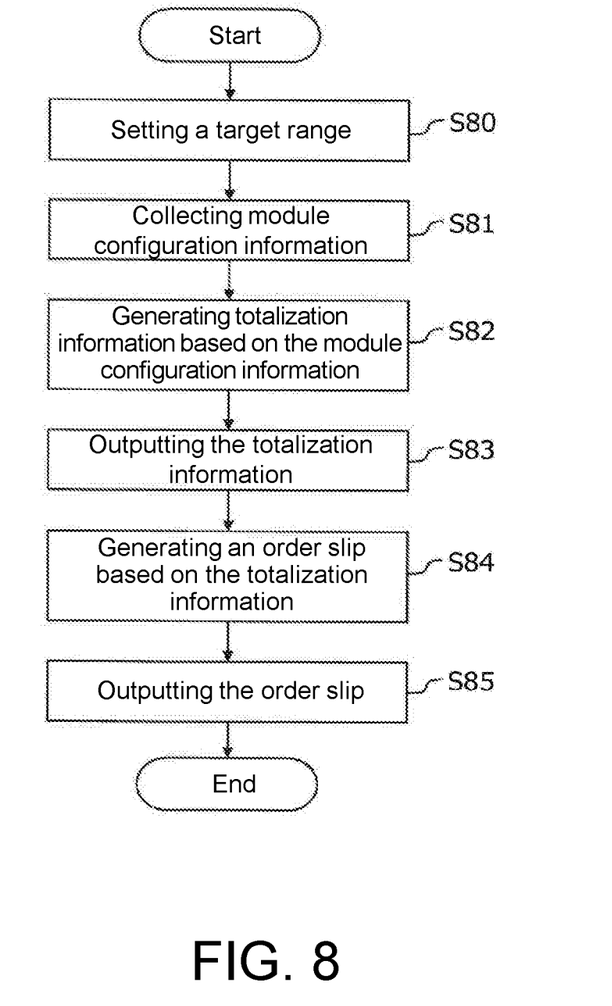
FIG. 8 is a diagram showing an example of a generation process of the totalization information.
Figure 9:
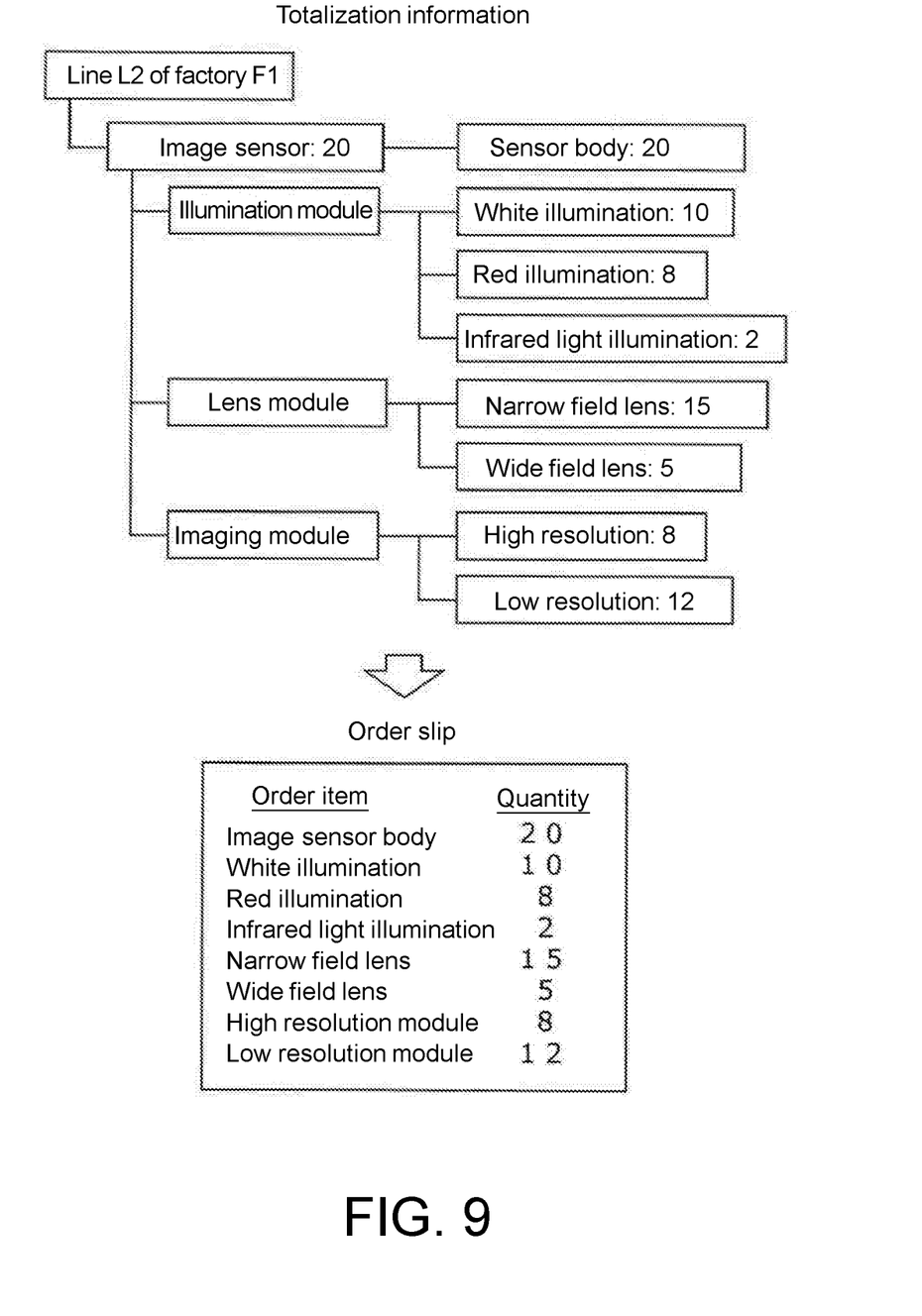
FIG. 9 is a diagram showing an example of an output of the totalization information and an order slip.

FIG. 8 is an example of a generation process of the totalization information performed by the information processing device 10, and FIG. 9 is an example of the totalization information generated by the information processing device 10 and the order information (order slip in this example) generated based on the totalization information.

Since the processes of steps S80 to S81 are similar to the processes of steps S60 to S61 of FIG. 6, the description thereof is omitted.

In steps S82 to S83, the information generation part 41 performs totalization for each format of module with respect to all of the image sensors 2 installed in the line L2 by using the module configuration information collected in step S81 and generates and outputs totalization information. The totalization information is information indicating the quantity of each format of module. In the example of FIG. 9, it is shown that 20 image sensors 2 are installed in the line L2 of the factory F1. As the illumination modules, 10 white illuminations, 8 red illuminations, and 2 infrared light illuminations are used. As the lens modules, 15 narrow field lenses and 5 wide field lenses are used. As the imaging modules, 8 high resolution modules and 12 low resolution modules are used. Such totalization information is useful for grasping and managing the quantity of each format of module used in the image sensor group installed in the target range. Also, the totalization information may be used for the purpose of grasping the equipment cost in the target range, for example.

In steps S84 to S85, the information generation part 41 generates and outputs an order slip based on the totalization information. The lower part of FIG. 9 is an example of the order slip. The order slip may be used for purchasing equipment at the time when a copy line having the same configuration as the line L2 is newly installed. With such a slip issuance function, labor required for preparing equipment for the copy line is significantly reduced.

(4) Comparison of the Module Configuration

Figure 10:
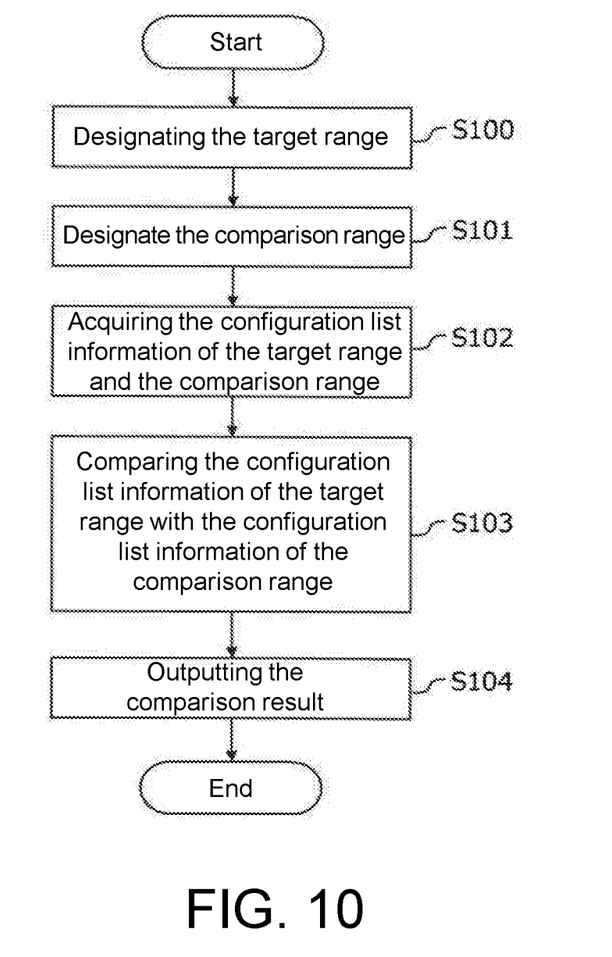
FIG. 10 is a diagram showing an example of a configuration comparison process.
Figure 11A:
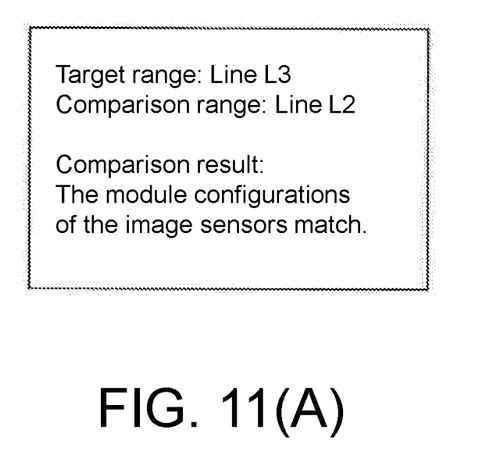
FIG. 11(A) and FIG. 11(B) are diagrams showing examples of outputs of the result of the configuration comparison process.
Figure 11B:
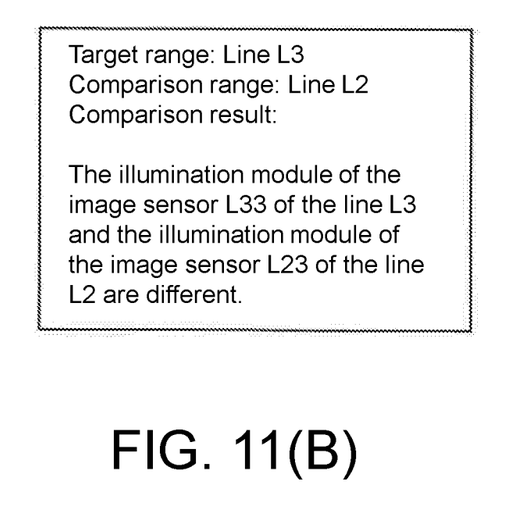

FIG. 10 is an example of a configuration comparison process performed by the information processing device 10, and FIG. 11(A) and FIG. 11(B) are examples of display of the result of the configuration comparison process. Hereinafter, an example of comparing the module configuration of the line L2 with the module configuration of the line L3, which is a copy line of the line L2, will be described.

In step S100, the range designation part 42 lets the user designate the target range. Here, it is assumed that the line L3, which is a copy line, is selected as the target range. Next, in step S101, the range designation part 42 lets the user designate the comparison range. Here, it is assumed that the line L2, which is the original line, is selected as the comparison range.

In step S102, the information acquisition part 40 reads the configuration list information of the target range (line L3) and the comparison range (line L2) respectively from the database. Instead of reading the configuration list information from the database, the information acquisition part 40 may also collect the module configuration information from the image sensors 2 installed on the line L3 or the line L2 and generate the configuration list information.

In step S103, the comparison part 43 compares the configuration list information of the target range (line L3) with the configuration list information of the comparison range (line L2) and checks whether the module configuration of the image sensor group of the line L3 and the module configuration of the image sensor group of the line L2 are the same or different. In step S104, if the module configurations of the line L2 and of the line L3 match, the information output part 44 displays it as the result (FIG. 11(A)). On the other hand, if the module configurations of the line L2 and the line L3 are different, information specifying the image sensors in which the module configuration is different, information indicating the module configuration that is different, etc. are displayed (FIG. 11(B)). According to this configuration, it is possible to easily check whether the image sensor group in the target range and a second image sensor group in the comparison range are the same or different. For example, when a copy line is installed, the configuration comparison between the original line and the copy line is performed, and it is possible to easily find the image sensors 2 in which modules of different formats are attached.

<Others>

Nevertheless, the above embodiment merely exemplifies a configuration example of the disclosure. The disclosure is not limited to the specific forms described above, and it is possible to make various modifications within the scope of the technical idea of the disclosure. For example, although the above embodiment illustrates an example that the three modules are the illumination part, the lens part, and the imaging part, the components to be attached to the image sensor are not limited thereto. For example, an optical filter, the input/output interface, the processing part (processor or memory), the display, etc. may also be modularized. Also, any information may be stored in the module memory. Regarding the forms in which the smart camera is provided (delivery forms), the modules may be provided separately to be assembled on the user side, or the smart camera may be provided with the illumination module and the lens module incorporated in the sensor body. In the case of the latter form, there is no need to adjust the optical conditions on the user side, so it has the advantage that the image sensor can be introduced more easily.

According to this configuration, since each of the components is provided with a non-volatile memory and specific information related to the component is stored in the memory, it is possible to handle the component (hardware) and the specific information thereof (software) in a linked manner. Moreover, since the information processing device is configured to acquire information from each of the image sensors via the network and, based on the information, generate the configuration list information indicating the combination of the components for each of the image sensors installed in the target range, it is easy to collect accurate information on the components of each of the image sensors installed in the target range. Such configuration list information is useful for grasping, managing, and inspecting the configuration of each of the image sensors installed in the target range. Here, the "target range" is a range for which information such as the configuration list information is generated. The target range may be set to include all the image sensors of the sensor system, or the target range may be set to include only some of the image sensors.

The information generation part may perform totalization for each format of component with respect to the image sensor group installed in the target range and generate totalization information indicating a quantity of each format of component. Such totalization information is useful for grasping and managing the quantity of each format of component used for the image sensor group installed in the target range. Also, the totalization information may be used for the purpose of grasping the equipment cost in the target range, for example.

The information generation part may generate order information for ordering components required for preparing a new image sensor group having a same configuration as the image sensor group installed in the target range based on the totalization information. According to this configuration, the preparation (purchase of components, etc.) of the new image sensor group having the same configuration as the image sensor group installed in the target range becomes easy. The order information may be a paper document (e.g., order slip) or electronic information (e.g., order data).

The sensor system may include a range designation part for receiving designation of the target range performed by a user. With such a configuration, the user can designate any target range. The target range may be, for example, a factory, a production line in the factory, or a process in the production line. With such a configuration, for example, it is possible to acquire the configuration of all the image sensors in the factory, acquire the configuration of the image sensors for each production line or each production process, etc., which is excellent in convenience.

A comparison part may be provided for extracting a difference between the image sensor group installed in the target range and a second image sensor group installed in a comparison range which is a range different from the target range by comparing the configuration list information of the image sensor group installed in the target range and the configuration list information of the second image sensor group installed in the comparison range. According to this configuration, it is possible to easily check whether the image sensor group in the target range and the second image sensor group in the comparison range are the same or different. For example, when a copy line is installed, by comparing the configurations of the original line and the copy line, it is possible to easily find the image sensors in which components of different formats are attached.

The plurality of components may include an illumination part for illuminating a subject, a lens part for forming an optical image of the subject, and an imaging part for generating an image based on the optical image. By changing the combination of the illumination part, the lens part, and the imaging part, it is possible to configure the image sensors of various specifications.

A second aspect of the disclosure provides an information processing device connected to a plurality of image sensors via a network. The image sensor is a modular image sensor configured by combining a plurality of modularized components. Each of the plurality of components includes a non-volatile memory for storing specific information related to the component. The information processing device includes an information acquisition part for acquiring the information stored in the non-volatile memory of the component constituting the image sensor from each of the image sensors in an image sensor group installed in a target range via the network, and an information generation part for generating configuration list information indicating a combination of the components for each of the image sensors with respect to the image sensor group installed in the target range based on the information acquired by the information acquisition part.

According to this configuration, the information processing device is configured to acquire information from each of the image sensors via the network and, based on the information, generate the configuration list information indicating the combination of the components of each of the image sensors installed in the target range. Therefore, it is possible to easily collect accurate information on the components of each of the plurality of image sensors installed in the target range. Such configuration list information is useful for grasping, managing, and inspecting the configuration of each of the image sensors installed in the target range.

A third aspect of the disclosure provides a sensor management method for managing a plurality of image sensors by an information processing device in a production line provided with a plurality of modular image sensors configured by combining a plurality of modularized components. Each of the plurality of components of the image sensors is provided with a non-volatile memory for storing specific information related to the component. The sensor management method includes: acquiring the information stored in the non-volatile memory of the component constituting the image sensor from each of the image sensors in an image sensor group installed in a target range via the network by the information processing device, and generating configuration list information indicating a combination of the components for each of the image sensors with respect to the image sensor group installed in the target range based on the acquired information by the information processing device.

According to this configuration, it is possible to easily collect accurate information on the components of each of the plurality of image sensors installed in the target range by the information processing device. Such information is useful for grasping, managing, and inspecting the configuration of each of the image sensors installed in the target range.

According to the disclosure, it is possible to provide a technique for facilitating management of image sensors having a modular structure.

<Appendix>

(1) A sensor system including a plurality of image sensors (2) and an information processing device (10) connected to the plurality of image sensors (2) via a network, wherein the image sensor (2) is a modular image sensor configured by combining a plurality of modularized components (20, 21, 22), each of the plurality of components (20, 21, 22) includes a non-volatile memory (200, 210, 220) for storing specific information related to the component, and the information processing device (10) includes:

an information acquisition part (40) for acquiring the information stored in the memory of the component (20, 21, 22) constituting the image sensor (2) from each of the image sensors (2) in an image sensor group installed in a target range via the network; and an information generation part (41) for generating configuration list information indicating a combination of the components (20, 21, 22) for each of the image sensors (2) with respect to the image sensor group installed in the target range based on the information acquired by the information acquisition part (40).

(2) An information processing device (10) connected to a plurality of image sensors (2) via a network, wherein the image sensor (2) is a modular image sensor configured by combining a plurality of modularized components (20, 21, 22), each of the plurality of components (20, 21, 22) includes a non-volatile memory (200, 210, 220) for storing specific information related to the component, and the information processing device (10) includes:

an information acquisition part (40) for acquiring the information stored in the memory (200, 210, 220) of the component constituting the image sensor from each of the image sensors (2) in an image sensor group installed in a target range via the network; and an information generation part (41) for generating configuration list information indicating a combination of the components for each of the image sensors (2) with respect to the image sensor group installed in the target range based on the information acquired by the information acquisition part (40).

(3) A sensor management method for managing a plurality of image sensors (2) by an information processing device (10) in a production line provided with a plurality of modular image sensors (2) configured by combining a plurality of modularized components (20, 21, 22), wherein each of the plurality of components (20, 21, 22) of the image sensors is provided with a non-volatile memory (200, 210, 220) for storing specific information related to the component, and the sensor management method includes:

acquiring the information stored in the memory (200, 210, 220) of the component constituting the image sensor (2) from each of the image sensors (2) in an image sensor group installed in a target range via the network by the information processing device (10), and generating configuration list information indicating a combination of the components for each image sensor (2) with respect to the image sensor group installed in the target range based on the acquired information by the information processing device (10).

What is claimed is:

1. A sensor system comprising a plurality of image sensors and an information processing device connected to the plurality of image sensors via a network, wherein
   each of the plurality of image sensors is a modular image sensor configured by combining a plurality of components which are modularized,
   each of the plurality of components comprises a non-volatile memory for storing specific information related to the component, and
   the information processing device comprises a processor configured to:
      acquire an information stored in the non-volatile memory of the component constituting the image sensor from each of the image sensors in an image sensor group installed in a target range via the network;
      generate configuration list information indicating a combination of the components for each of the image sensors with respect to the image sensor group installed in the target range based on the information that are acquired; and
      extract a difference between the image sensor group installed in the target range and a second image sensor group installed in a comparison range which is a range different from the target range by comparing the configuration list information of the image sensor group installed in the target range and the configuration list information of the second image sensor group installed in the comparison range.

2. The sensor system according to claim 1, wherein the processor is configured to perform totalization for each format of component with respect to the image sensor group installed in the target range and generates totalization information indicating a quantity of each format of component.

3. The sensor system according to claim 2, wherein the processor is configured to generate order information for ordering components required for preparing a new image sensor group having a same configuration as the image sensor group installed in the target range based on the totalization information.

4. The sensor system according to claim 1, the processor is configured to receive a designation of the target range performed by a user.

5. The sensor system according to claim 1, wherein the target range is a factory, a production line in the factory, or a process in the production line.

6. The sensor system according to claim 1, wherein the plurality of components comprise an illumination part for illuminating a subject, a lens part for forming an optical image of the subject, and an imaging part for generating an image based on the optical image.

7. An information processing device connected to a plurality of image sensors via a network, wherein
   each of the plurality of image sensors is a modular image sensor configured by combining a plurality of components which are modularized,
   each of the plurality of components comprises a non-volatile memory for storing specific information related to the component, and
   the information processing device comprises a processor configured to:
      acquire an information stored in the non-volatile memory of the component constituting the image sensor from each of the image sensors in an image sensor group installed in a target range via the network;
      generate configuration list information indicating a combination of the components for each of the image sensors with respect to the image sensor group installed in the target range based on the information that are acquired; and
      extract a difference between the image sensor group installed in the target range and a second image sensor group installed in a comparison range which is a range different from the target range by comparing the configuration list information of the image sensor group installed in the target range and the configuration list information of the second image sensor group installed in the comparison range.

8. A sensor management method for managing a plurality of image sensors by an information processing device in a production line provided with a plurality of modular image sensors configured by combining a plurality of components which are modularized, wherein
   each of the plurality of components of each of the plurality of image sensors is provided with a non-volatile memory for storing specific information related to the component, and the sensor management method includes:
      acquiring an information stored in the non-volatile memory of the component constituting the image sensor from each of the image sensors in an image sensor group installed in a target range via the network by the information processing device,
      generating configuration list information indicating a combination of the components for each of the image sensors with respect to the image sensor group installed in the target range based on the acquired information by the information processing device, and
      extracting a difference between the image sensor group installed in the target range and a second image sensor group installed in a comparison range which is a range different from the target range by comparing the configuration list information of the image sensor group installed in the target range and the configuration list information of the second image sensor group installed in the comparison range.

* * * * *